United States Patent [19]
Shimizu et al.

[11] Patent Number: 5,788,578
[45] Date of Patent: Aug. 4, 1998

[54] HOMOKINETIC JOINT HAVING AN OUTER RING FORMED WITH TRACK GROOVES WHICH HAVE A CONSTANT EFFECTIVE DEPTH

[75] Inventors: Osamu Shimizu; Hisaaki Kura, both of Iwata; Shigeyoshi Ishiguro, Kakegawa; Shuji Mochinaga, Iwata; Katsuyuki Ikei, Fukuroi; Masami Yamaguchi, Iwata; Kenichi Nakano, Hamana-gun; Morihisa Yoshioka, Shizuoka, all of Japan

[73] Assignee: NTN Corporation, Osaka, Japan

[21] Appl. No.: 601,359

[22] Filed: Feb. 16, 1996

[30] Foreign Application Priority Data

Feb. 16, 1995 [JP] Japan ................. 7-027891
Dec. 26, 1995 [JP] Japan ................. 7-338972
Jan. 31, 1996 [JP] Japan ................. 8-015245

[51] Int. Cl.$^6$ ........................... F16D 3/224
[52] U.S. Cl. ........................... 464/145; 464/906
[58] Field of Search ................... 464/143, 144, 464/145, 146, 906

[56] References Cited

U.S. PATENT DOCUMENTS

| 4,188,803 | 2/1980 | Otsuka et al. | 464/145 |
| 4,229,952 | 10/1980 | Aucktor et al. | 464/145 |
| 4,589,857 | 5/1986 | Okoshi | 464/906 X |
| 4,820,240 | 4/1989 | Girguis | 464/145 |
| 5,509,856 | 4/1996 | Welschof | 464/145 |

FOREIGN PATENT DOCUMENTS

| 42284482 | 4/1993 | Germany | 464/145 |
| 2206394 | 1/1989 | United Kingdom | 464/145 |

*Primary Examiner*—Eileen A. Dunn
*Attorney, Agent, or Firm*—Wenderoth, Lind & Ponack, L.L.P.

[57] ABSTRACT

A homokinetic joint which can be manufactured at low cost. Its outer ring and inner ring has a spherical inner surface and a spherical outer surface both formed with a plurality of track grooves in which are received torque transfer balls retained by a cage. The spherical inner surface and the track grooves of the outer ring are finished by plastic working, so that no additional finishing work is necessary. Thus, the outer ring can be manufactured at low cost.

4 Claims, 14 Drawing Sheets

HOMOKINETIC JOINT HAVING AN OUTER RING FORMED WITH TRACK GROOVES WHICH HAVE A CONSTANT EFFECTIVE DEPTH

BACKGROUND OF THE INVENTION

This invention relates to a homokinetic joint.

Figure 15:
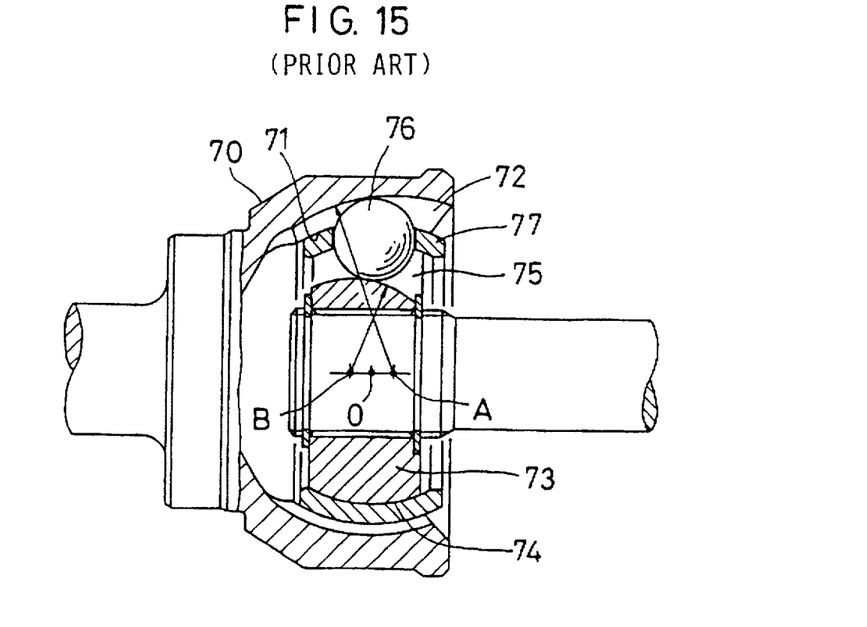
FIG. 15 is a sectional view of a conventional homokinetic joint.

FIG. 15 shows a conventional homokinetic joint. It comprises an outer ring 70 having a spherical inner surface 71 in which a plurality of axially arcuate track grooves 72 are formed, an inner ring 73 having a spherical outer surface 74 in which a plurality of axial, arcuate track grooves 75 are formed, and torque transfer balls 76 received in both track grooves 72 and 75 and retained by a cage 77. Torque is transmitted between the outer ring 70 and the inner ring 73 through the torque transfer balls 76.

The track grooves 72 and 75 are arranged such that the centers A and B of the track grooves 72 and 75 are spaced from the angular center O of the joint by the same distance in axially opposite directions. Thus, the centers of the torque transfer balls 76 are always arranged on the bisector of the working angle formed between the axes of the outer ring 70 and the inner ring 73.

Such an outer ring 70 may be formed by cutting. But cutting requires a lot of time and the yield is low.

To shorten the forming time and increase the yield, Examined Japanese Patent Publication 61-5814 proposes to form such an outer ring in a mold using a split punch and a drawing die.

Figure 16:
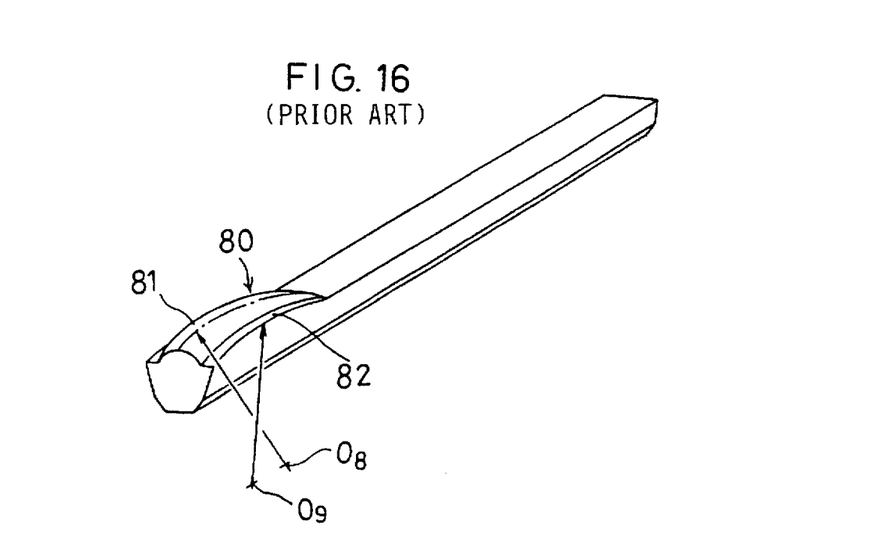
FIG. 16 is a perspective view of a conventional punch for forming an outer ring.

FIG. 16 shows the split punch 80 used in this method. The punch has a track forming portion 81 for forming the track grooves 72 in the outer ring 70, and a spherical surface forming portion 82 for forming the spherical inner surface 71 of the outer ring 70. The center of curvature O8 of the track forming portion 81 is axially offset from the center of curvature O9 of the spherical surface forming portion 82.

Figure 17:
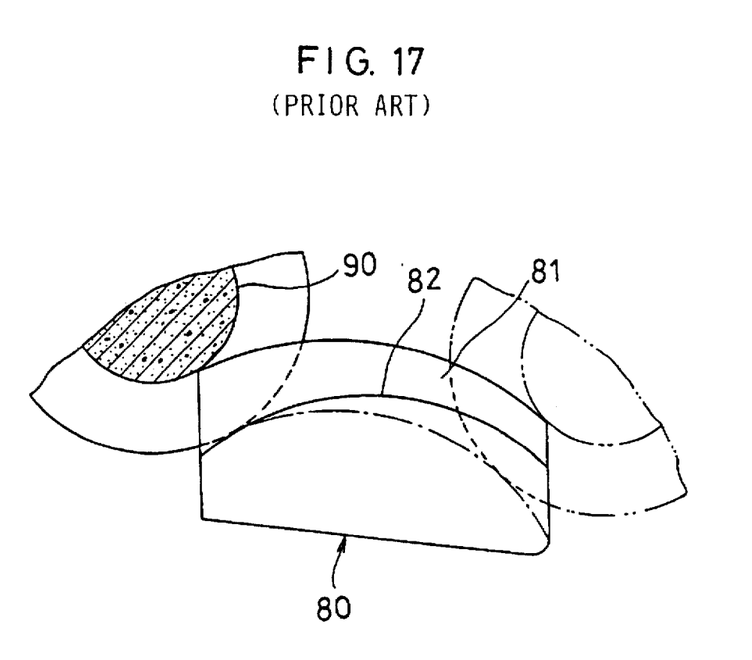
FIG. 17 is a schematic view of the punch of FIG. 16 showing how it is ground.

If the track forming portion 81 of the split punch 80 is finished by grinding with a grooved grindstone 90 shown in FIG. 17, the spherical surface forming portion 82 will be removed substantially entirely as shown by chain line by the grindstone 90. Namely, such a grindstone cannot grind only the track forming portion 81 while leaving the spherical surface forming portion 82 intact.

Thus, the track forming portion 81 and the spherical surface forming portion 82 had to be formed by electric discharge machining.

But the split punch 80 thus formed by electric discharge machining is low in the surface accuracy of the track forming portion 81 and the spherical surface forming portion 82. Such a punch cannot finish the track grooves 72 and the spherical inner surface 71 of the outer ring 70 with high accuracy. Thus, in order to finish them with high dimensional accuracy, they have to be finished by grinding after forging the outer ring in the mold. It takes a long time and substantial cost to manufacture such an outer ring 70.

SUMMARY OF THE INVENTION

An object of this invention is to provide a homokinetic joint which can be manufactured at low cost and a method of manufacturing an outer ring of a homokinetic joint at low cost.

According to this invention, there is provided a homokinetic joint comprising an outer ring having a spherical inner surface formed with curving track grooves, an inner ring having a spherical outer surface formed with as many track grooves as the track grooves formed in the outer ring, torque transfer balls received in the track grooves formed in the inner and outer rings, and a cage guided by the spherical inner surface of the outer ring and the spherical outer surface of the inner ring for retaining the torque transfer balls in position, the track grooves formed in the outer ring and the track grooves formed in the inner ring having their respective centers offset in opposite axial directions by an equal distance with respect to the angular center of the joint, characterized in that the surfaces of the track grooves formed in the outer ring and the spherical inner surface of the outer ring are finished by plastic forming.

There is also provided a method of forming an outer ring of a homokinetic joint comprising the steps of arranging a plurality of punches in a circle, the each punch having a spherical surface forming portion having a width that increases gradually toward its center from both ends thereof, a curving track forming portion bulging above the spherical surface forming portion so as to extend between both ends of the spherical surface forming portion, the track forming portion having a center of curvature at a point offset rearwardly of the spherical surface forming portion with respect to the sphere center of the spherical surface forming portion, and arcuate shoulder portions formed on both sides of the track forming portion at rear end thereof and having a center of curvature on a line on which the center of curvature of the track forming portion lies, the entire surface of the track forming portion except the shoulder portions and the entire surface of the spherical surface forming portion being formed by grinding, inserting the plurality of punches into a blank for the outer ring having a diameter increasing toward its open end and having a plurality of track grooves in the inner periphery thereof, and drawing the outer periphery of the blank by means of a drawing die with the track forming portions of the plurality of punches inserted in the track grooves formed in the blank, thereby pressing the inner surface of the blank against the spherical surface forming portion and the track forming portion of the each punch.

Before plastically deforming the outer ring blank, it is preferable to preform its spherical inner surface and the deeper half portion of each track groove with a preforming punch, while forming recesses at deeper ends of edges formed along the boundaries between the spherical inner surface and the surfaces of the track grooves.

The preforming punch used for this purpose has a semispherical portion for forming a spherical surface at one end thereof, the semispherical portion having on its outer periphery a plurality of curving track forming portions, and arcuate land portions provided along the boundaries between the surfaces of the track forming portions and the surface of the spherical surface forming portion.

The blank may be preformed with the preforming punch in a cold, warm or hot atmosphere.

BRIEF DESCRIPTION OF THE DRAWINGS

Other features and objects of the present invention will become apparent from the following description made with reference to the accompanying drawings, in which.

3

DETAILED DESCRIPTION OF THE INVENTION

The embodiments are now described with reference to FIGS. 1–14.

Figure 1:
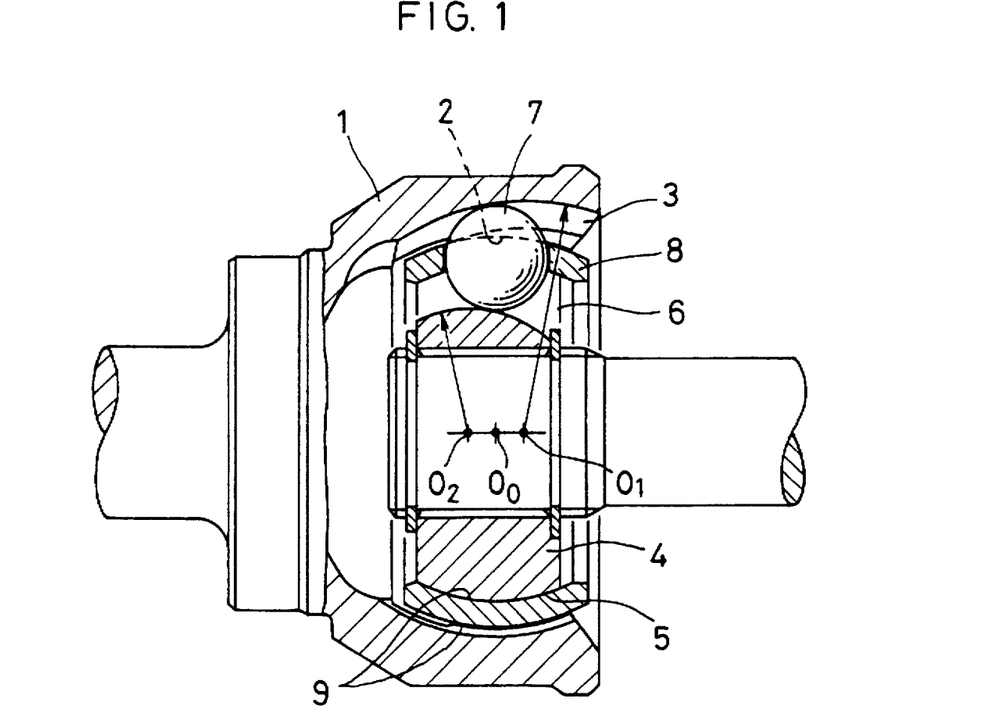
FIG. 1 is a sectional view of an embodiment of the homokinetic joint according to the present invention.

FIG. 1 shows the homokinetic joint embodying the invention. It comprises an outer ring 1 having a spherical inner surface 2 in which are formed a plurality of curving track grooves 3, an inner ring 4 having a spherical outer surface 5 formed with as many track grooves 6 as the track grooves 3, and torque transfer balls 7 received in both track grooves 3 and 6 of the outer and inner rings 1 and 4 and held in position by a cage 8 mounted between the rings 1 and 4.

The cage 8 has outer and inner spherical surfaces 9 that are kept in contact with and guided by the spherical inner surface 2 of the outer ring 1 and the spherical outer surface 5 of the inner ring 4.

4

The track grooves 3 and 6 are formed such that the center O1 of the track grooves 3 in the outer ring 1 and the center O2 of the track grooves 6 in the inner ring 4 are offset by the same distance from the angular center O0 of the joint in the axially opposite directions.

The angular center O0 of the joint, and the centers of the spheres including the spherical inner surface 2 of the outer ring 1 and the spherical outer surface 5 of the inner ring 4, respectively, are all on the same point.

Figure 2A:
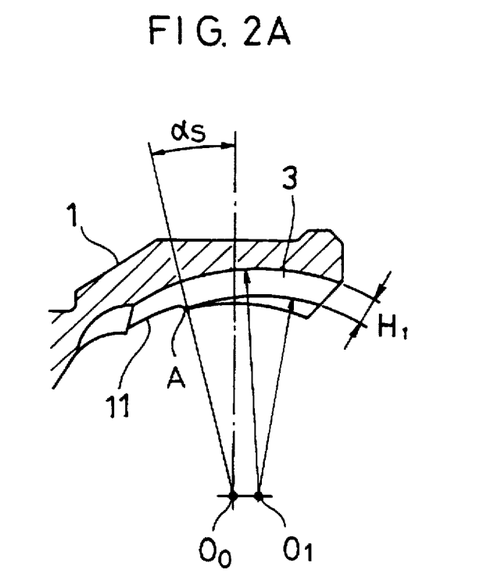
FIG. 2A is an enlarged sectional view of a track portion of the outer ring of FIG. 1.
Figure 2B:
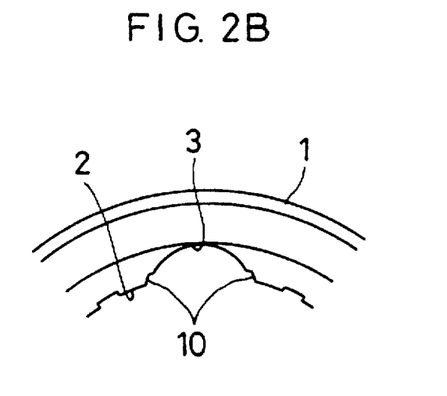
FIG. 2B is a side view of the outer ring shown in FIG. 1.

FIGS. 2A and 2B are partial enlarged views of the outer ring 1. Reliefs 10 are formed in each track groove 3 on both sides. The track grooves 3 have a constant effective depth H1 from the open end of the outer ring 1 to a point A which is offset toward the deep side of the outer ring by an angle αs with respect to the plane perpendicular to the axis of the outer ring 1 and including the center of the sphere including the spherical inner surface 2.

The angle αs is determined at 5 degrees or higher, taking into account the permissible torque applied to the joint when the working angle of the joint is within a normally used range when mounted on a car.

A recess 11 is formed by cutting in the spherical inner surface 2 over the area ranging from the point A to its deeper end.

But this recess 11 may not be formed according to the shape of the forged material from which the outer ring is formed.

The spherical surface 2 of the outer ring 1 and the surface of each of the track grooves 3 are finished by plastic working.

FIG. 3a–d shows a punch 20 used to form the outer ring of the above homokinetic joint. This punch has a spherical surface forming portion 21 and a curving track forming portion 22 formed on the spherical surface forming portion 21.

Figure 3A:
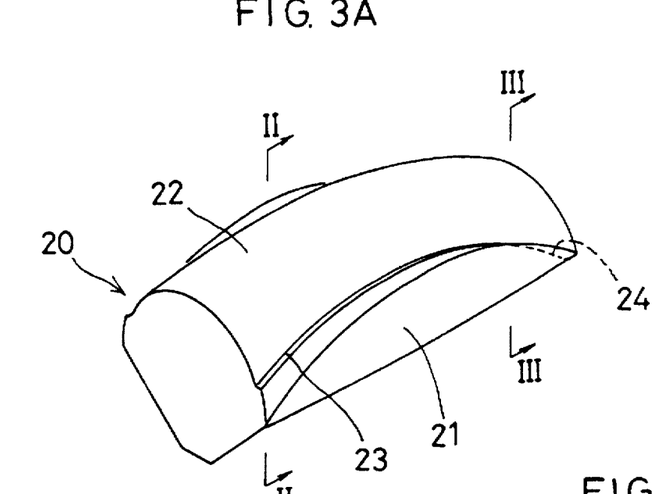
FIG. 3A is a perspective view of one embodiment of a punch according to the present invention.
Figure 3B:
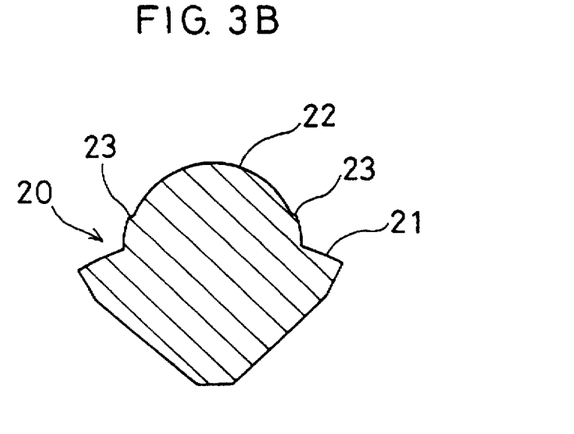
FIG. 3B is a sectional view taken along line II—II of FIG. 3A.
Figure 3C:
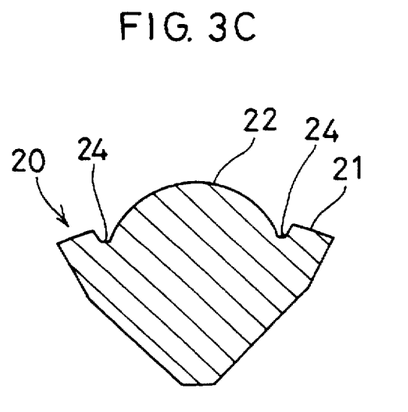
FIG. 3C is a sectional view taken along line III—III of FIG. 3A.
Figure 3D:
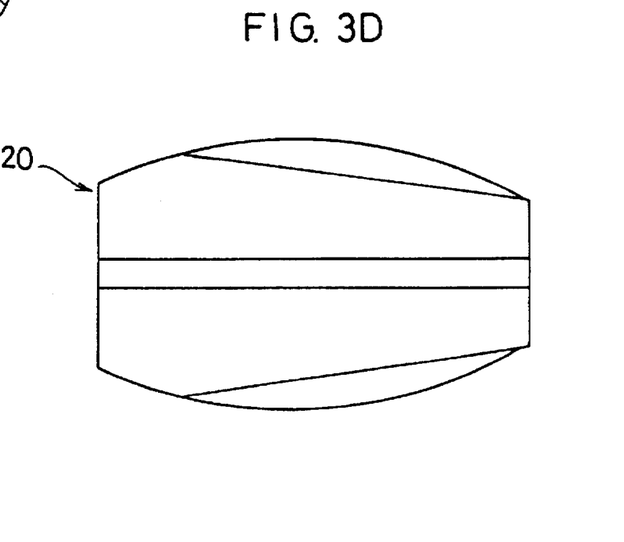
FIG. 3D is a bottom view of the punch of FIG. 3A.

The spherical surface forming portion 21 has a width that increases gradually toward its center from both ends. The track forming portion 22 extends arcuately from the front end of the spherical surface forming portion 21 to its rear end.

Figure 5A:
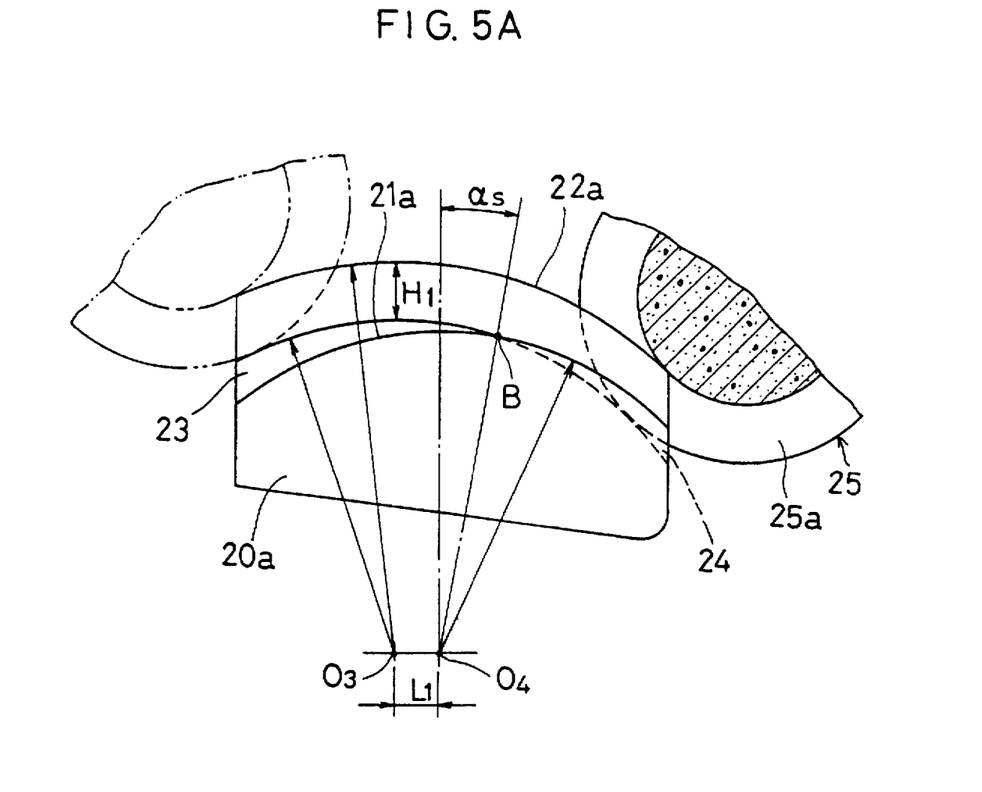
FIG. 5A is a front view of the punch showing how its track forming portion is ground.

As shown in FIG. 5A, the track forming portion 22a has a center of curvature O3 that is offset rearwardly of the spherical surface forming portion 21a from the center O4 of the spherical surface of the portion 21a by a distance L1, which is equal to the distance by which the center O0 of the spherical surface of the outer ring is offset from the center O1 of the track grooves 3.

The track forming portion 22a has arcuate shoulders 23 on both sides that extend from its rear end to longitudinal center. The angle αs formed by the line that connects the front end B of each shoulder 23 with the sphere center O4 and the vertical line that passes the sphere center O4 corresponds to the angle αs shown in FIG. 2.

Figure 5B:
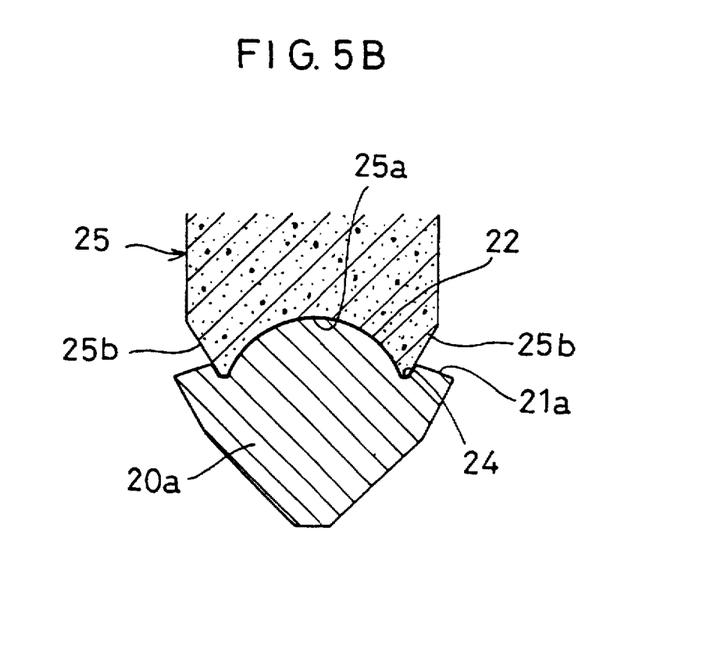
FIG. 5B is a side view of the punch shown in FIG. 5A.

Cuts 24 are formed in the spherical surface forming portion 21a along both sides of the track forming portion 22 near its front end (FIG. 5B). The bottom of each cut 24 connects smoothly with the top surface of the corresponding shoulder 23.

The spherical surface forming portion 21a is finished by grinding. The entire surface of the track forming portion 22a is also finished by grinding except the shoulders 23. The track forming portion 22a has a constant effective height H1 (FIG. 5A) at its portion where the shoulders 23 are formed.

Figure 4:
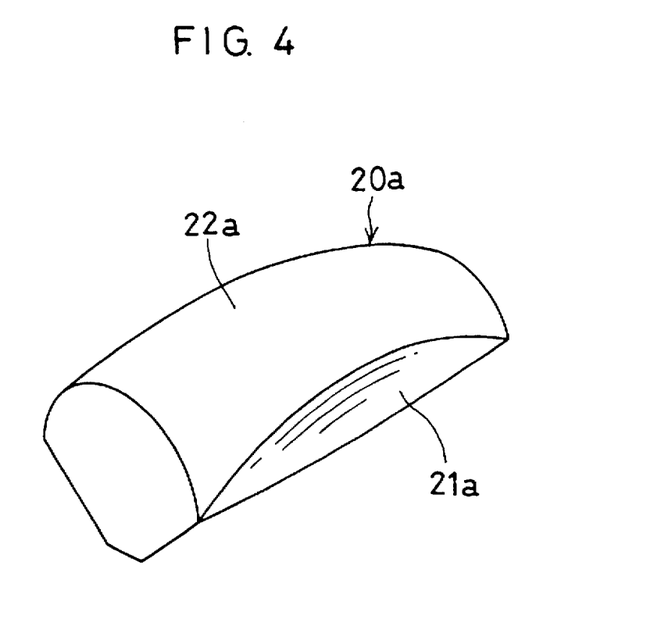
FIG. 4 is a perspective view of a blank for the punch shown in FIG. 3A.

The punch 20 is formed by grinding a raw material 20a for the punch shown in FIG. 4.

The punch material 20a has substantially the same shape as the punch 20 shown in FIG. 3 except that its spherical surface forming portion 21a and track forming portion 22a are a little more massive than the counterparts of the punch 20 and that the shoulders 23 are not formed. The punch 20 is formed by grinding the portions 21a and 22a of the punch material 20a to form the shoulders 23. The spherical surface forming portion 21a and the track forming portion 22a of the punch material 20a are formed by electric discharge machining.

To form the shoulders 23, the track forming portion 22a is ground by moving a circular grindstone 25 around the center of curvature O3 as shown in FIG. 5A.

As shown in FIG. 5B, the grindstone 25 used has an arcuate groove 25a in its outer periphery, and tapered surfaces 25b extending radially outwardly from both edges of the groove 25a.

By moving the grindstone 25 around center of curvature O3 of the track forming portion 22a, the surface of the track forming portion 22a is ground except its base portions on both sides. The shoulders 23 are thus formed.

By moving the grindstone 25, the cuts 24 are formed simultaneously at the front end of the spherical surface forming portion 21a, along the track forming portion 22.

Figure 6A:
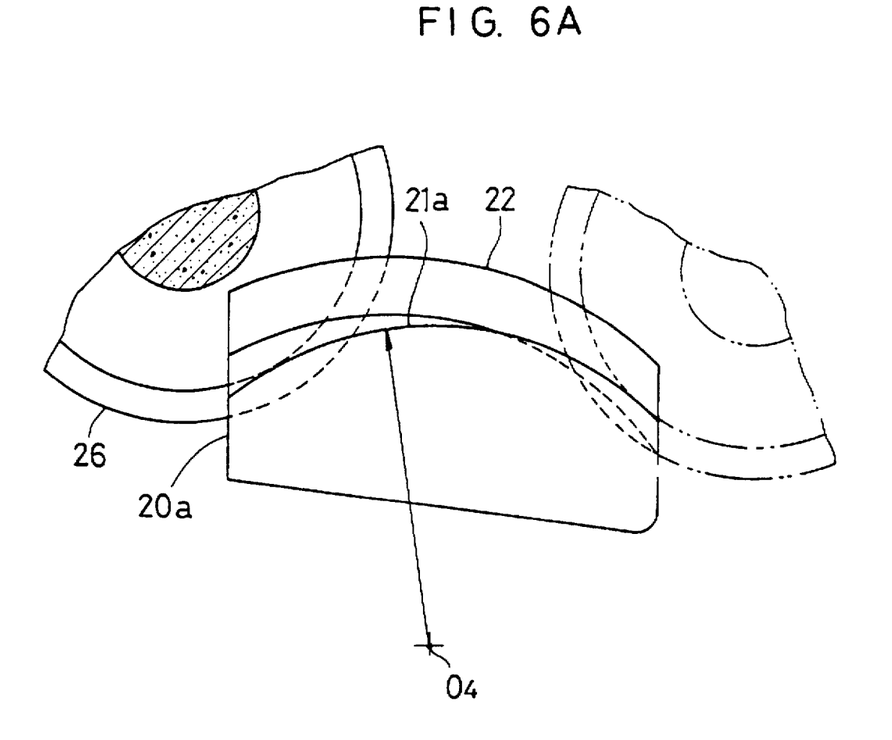
FIG. 6A is a front view of the punch showing how its spherical surface is ground.
Figure 6B:
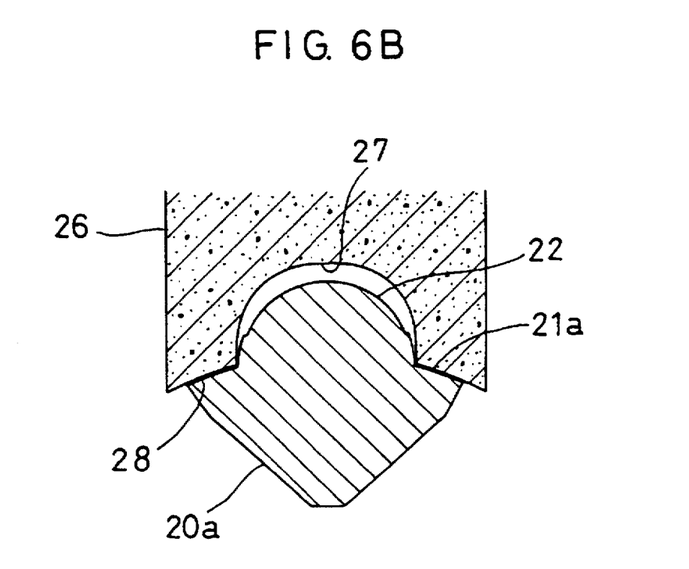
FIG. 6B is a side view of the punch shown in FIG. 6A.

The surface of the spherical surface forming portion 21a is ground by moving a grindstone 26 around the sphere center O4 as shown in FIG. 6A. The grindstone 26 has, as shown in FIG. 6B, a groove 27 in its outer periphery, and spherical surfaces 28 on both sides of the groove 27. The groove 27 is deeper than the maximum height of the track forming portion 22 so that the track forming portion 22 will not be ground when the grindstone 26 is moved around the sphere center O4.

By moving the grindstone 26 around the sphere center O4, the spherical surface forming portion 21a is ground.

Figure 7:
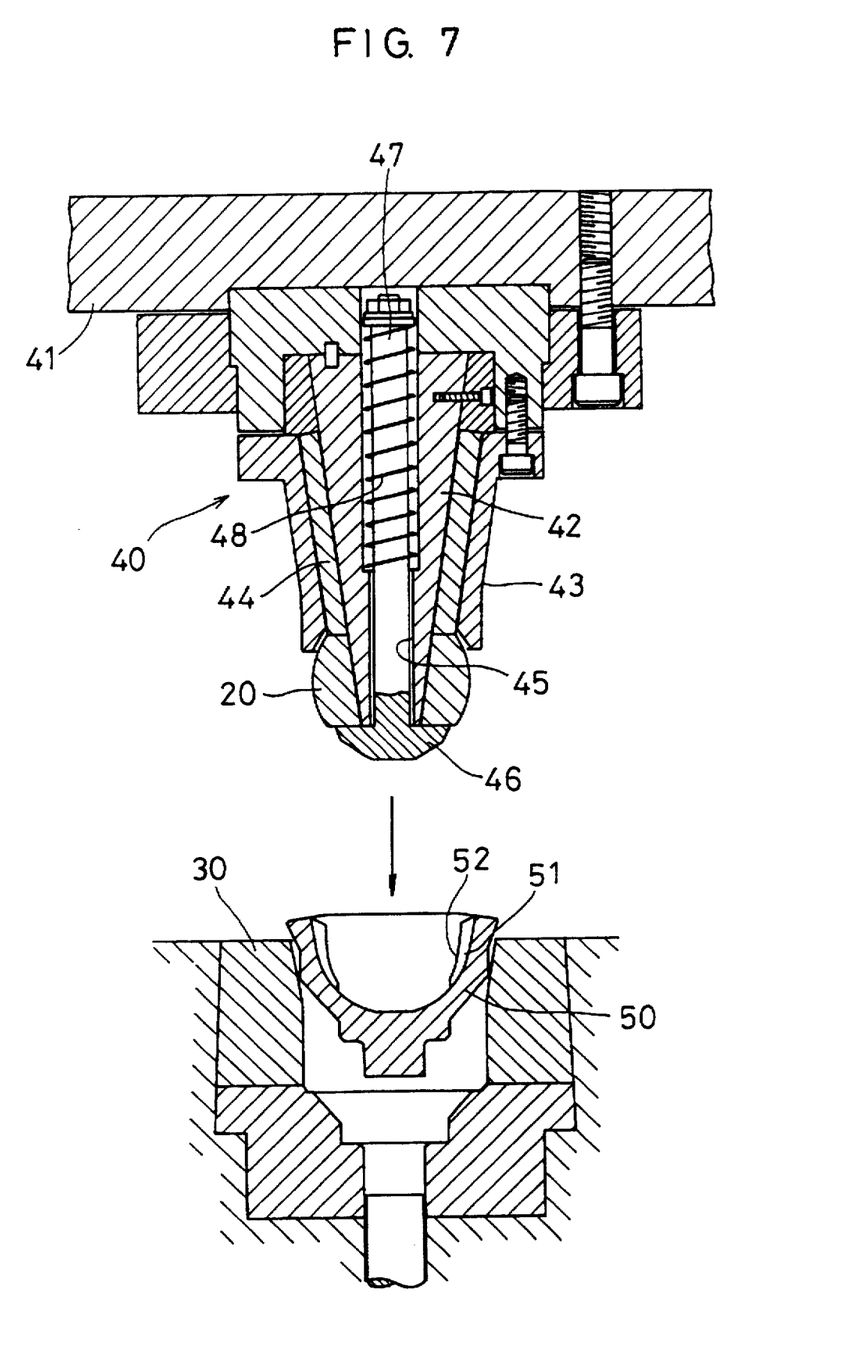
FIG. 7 is a vertical sectional front view of a device for forming the outer ring.

FIG. 7 shows a device for forming the outer ring. It comprises the punch 20, a drawing die 30 and a combination punch 40.

The combination punch 40 has a press slide 41 on which are fixedly mounted a tapered base 42 and a tapered retaining sheath 43 provided around the tapered base 42. A plurality of the punches 20 as shown in FIG. 3a–d are mounted on a punch holder 44 provided between the tapered base 42 and the retaining sheath 43 so as to be arranged side by side at predetermined intervals.

The tapered base 42 is formed with a through hole 45 along its axis. A shaft 47 of an end punch 46 is slidably inserted in the hole 45. A spring 48 mounted around the shaft 47 biases the shaft 47 upward to keep the end punch 46 in the raised position.

A blank 50 for an outer ring is a funnel-shaped member having an opening at one end. It has as many track grooves 51 as the punches 20 in its inner periphery.

Figure 8:
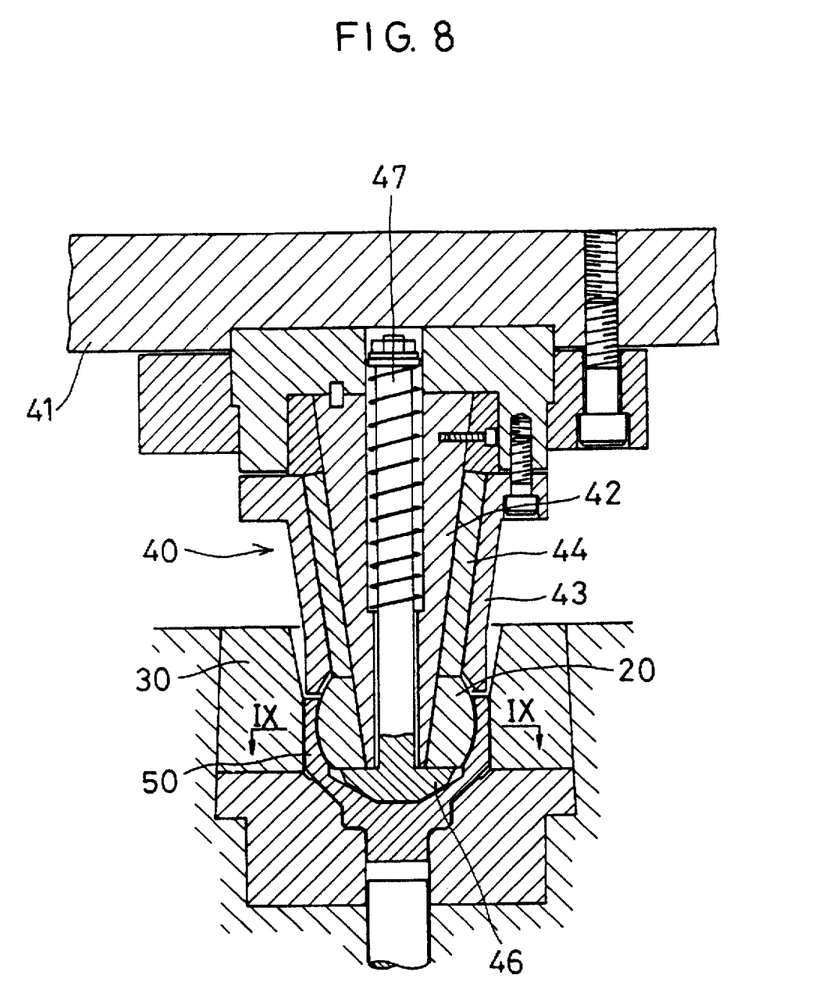
FIG. 8 is a vertical sectional front view of the device of FIG. 7 showing its different operational state.
Figure 9:
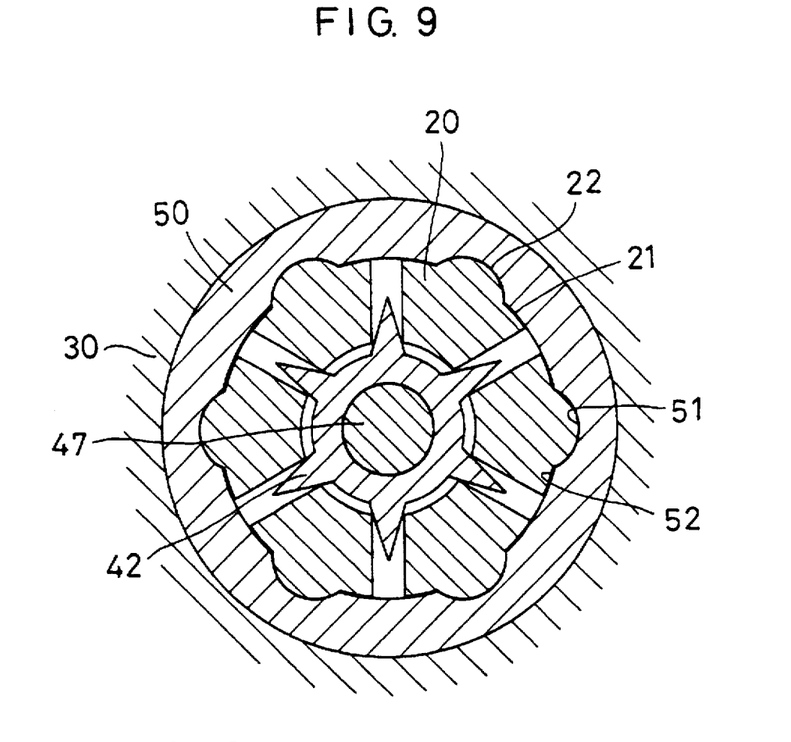
FIG. 9 is a sectional view taken along line IX—IX of FIG. 8.

By lowering the press splaced with the blank 50 placed in a drawing die 30, the end punch 46 abuts the spherical bottom of the outer ring blank 50, while the punches 20 fit in the track grooves 51. By further lowering the press slide 41 in this state, the diameter of the outer ring blank 50 will decrease by being drawn by the drawing die 30 (as shown in FIGS. 8 and 9). While the blank 50 is being drawn, the track grooves 51 and the spherical inner surface 52 of the blank 50 are plastically deformed by the track forming portions 22 and the spherical surface forming portions 21 of the punches 20, respectively, to predetermined shapes and dimensions. The blank 50 may be worked by cold, warm or hot drawing.

After forming the blank 50 into the outer ring, the press slide 41 is raised together with the tapered base 42 and the retaining sheath 43. As the press slide 41 is raised, the punches 20 will shrink, so that their track forming portions 22 disengage from the track grooves 51. The punches 20 and the end punch 46 are thus pulled out of the finished outer ring 1.

The spherical surface forming portion 21 and the track forming portion 22 of each punch 20 are formed by grinding, so that their surfaces can be formed with high accuracy. Thus, the track grooves 51 and the spherical inner surface 52 of the outer ring 1 can also be formed with high surface accuracy by using a plurality of such punches 20. Since they are ground with high accuracy by the punches 20, no post-finishing work is necessary. Thus, it is possible to considerably reduce the manufacturing cost.

Figure 10A:
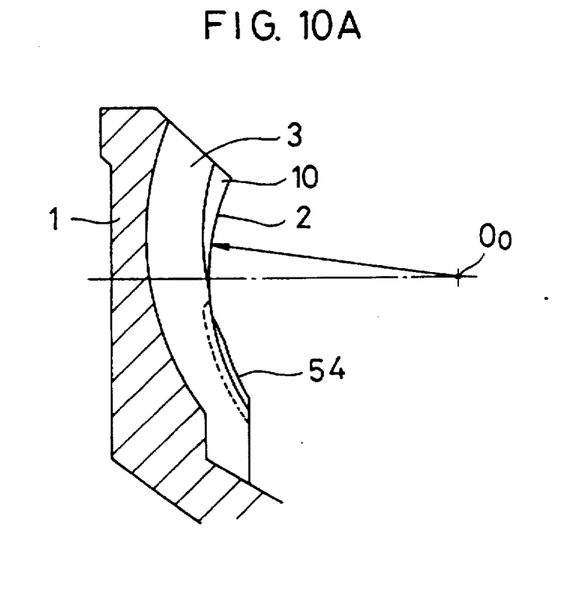
FIG. 10A is a sectional view of an outer ring formed by the device shown in FIG. 7.
Figure 10B:
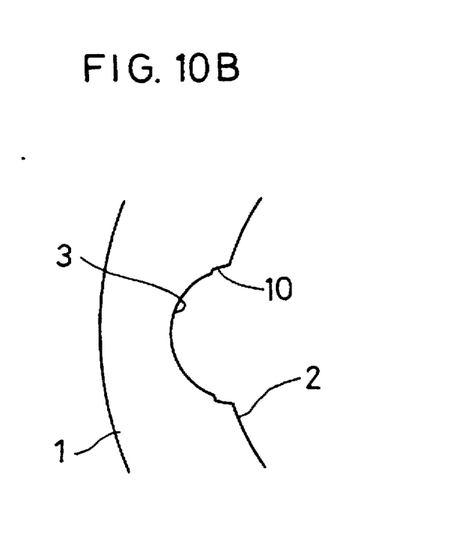
FIG. 10B is a plan view of the outer ring of FIG. 10A.

When forming the outer ring 1 with the punches 20, reliefs 10 are formed on both sides of each track groove 3 as shown in FIGS. 10A and 10B because the shoulders 23 are formed on both sides of the track forming portion 22 of each punch 20 near its rear end as shown in FIG. 3. When the homokinetic joint is assembled, grease is trapped in the reliefs 10, so that the ball rolling surface can be sufficiently lubricated with the grease in the reliefs 10.

Since the track forming portion 22 of each punch has a constant height from its rear end to a point slightly ahead of the sphere center O4, the track grooves 3 formed also have a constant effective depth from the open end of the outer ring 1 to a point slightly past the sphere center O0. Their effective depth decreases gradually from this point to the closed end of the outer ring 1.

Thus, the track grooves 3 formed by the punches 20 have a shallower effective depth near the inlet of the track grooves than the track grooves 72 formed in the outer ring 70 shown in FIG. 15. The permissible maximum torque applied to the outer ring 1 is thus small. But practically, this will have no adverse effect on the function of the homokinetic joint because the permissible torque applied is inherently high near the inlet of the track grooves 3.

When forming the outer ring 1 with the punches 20, the outer ring might be partially swollen like ribs in conformity with the configuration of the cuts 24 formed in the front end of the spherical surface forming portion 21 along the track forming portion 22.

FIG. 10A shows ribs 54 on such an outer ring thus formed. If such ribs 54 are formed, they have to be removed by turning or grinding.

But it is technically difficult to remove only the ribs 54. Thus, the spherical inner surface 52 is partially cut as shown by chain line in FIG. 10A to remove the ribs 54. By cutting the spherical inner surface 2 in FIG. 10A this way, the outer ring 1 shown in FIG. 1 is obtained.

Referring to FIG. 1, the torque transfer balls 7 of this homokinetic joint can roll along the track grooves 3 in the outer ring 1 and the track grooves 6 in the inner ring 4. Since the track grooves 3 and 6 of the rings 1 and 4 widen gradually toward the open end of the outer ring, the balls 7 are always urged outwardly.

Thus, the cage 8 is kept out of contact with the deeper part of the spherical inner surface 2 of the outer ring 1, so that the recess 11 formed in the deeper side of the spherical inner surface 2 will pose no problem. Even if the cage 8 is pushed in under a load applied thereto while torque is being transmitted with the homokinetic joint forming a working angle, the spherical inner surface 2 can bear the axial load applied to the cage 8 because the recess 11 is formed in the area deeper than the sphere center O0 of the spherical inner surface. Thus, there will be no practical problem.

Figure 11:
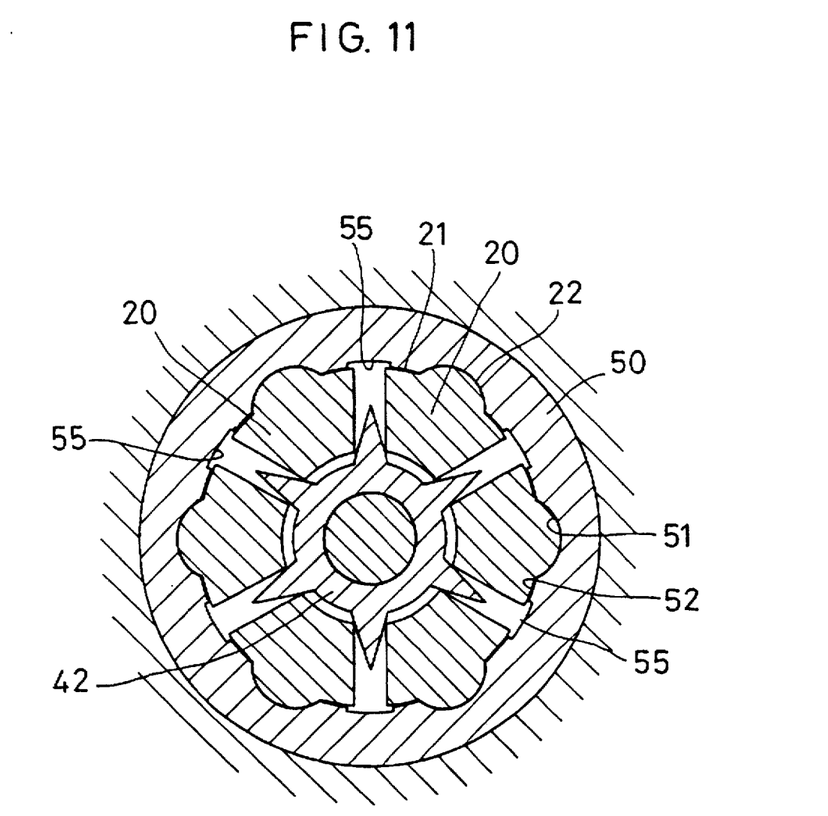
FIG. 11 is a sectional view of another type of blank for the outer ring.

As shown in FIG. 11 axial clearance grooves 55 may be formed in the spherical inner surface 52 of the outer ring blank 50 so that the spherical inner surface 52 will be deformed to fill the grooves 55 instead of swelling radially inwardly. This prevents swollen portion from being formed.

Figure 12A:
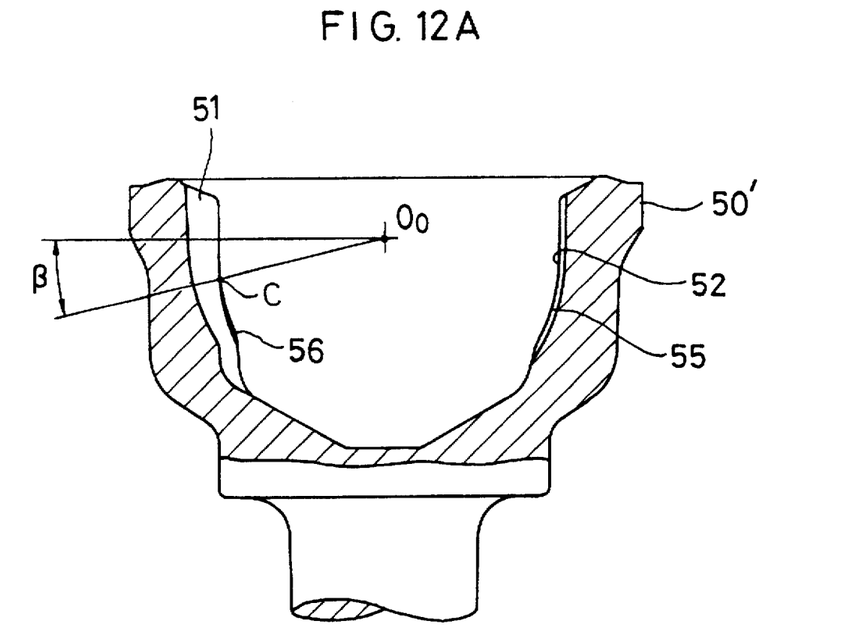
FIG. 12A is a sectional view of still another type of blank for the outer ring.
Figure 12B:
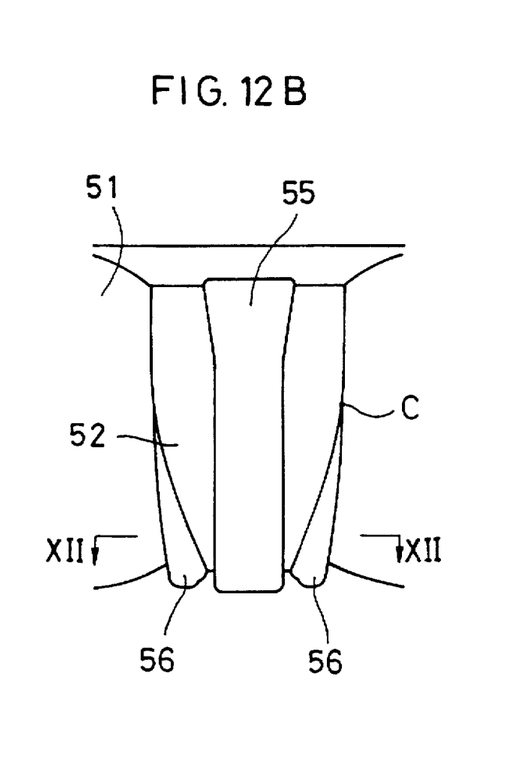
FIG. 12B is a front view of a spherical portion of the blank shown in FIG. 12A.
Figure 12C:
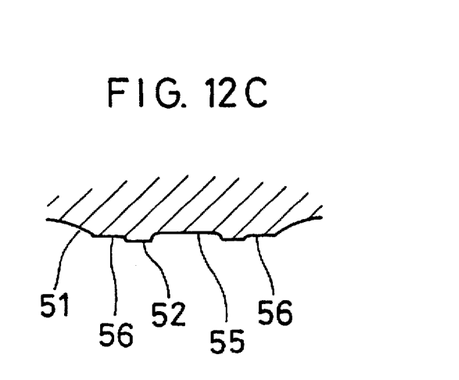
FIG. 12C is a sectional view taken along line XII—XII of FIG. 12B.

FIGS. 12A, 12B and 12C show a different forged blank 50' for an outer ring. Recesses 56 are formed in the deep end of the blank 50' along an edge-forming boundary between the spherical inner surface 52 and the track grooves 51 of the outer ring blank 50'. Each recess 56 narrows gradually from the deep end of the blank 50' toward its open end. The line passing the front end C of each recess 56 and the sphere center O0 of the spherical inner surface 52 forms an angle β (FIG. 12A) which is substantially equal to the sphere angle α shown in FIG. 2 with the line passing the sphere center O0 and intersecting the axis of the blank 50' at a right angle.

By subjecting this blank 50' to plastic deformation using the forming device shown in FIGS. 7 and 8, the track grooves 51 and the spherical inner surface 52 will be deformed to fill the recesses 56.

Thus, no undesirable swollen portion or ribs 54 as shown in FIG. 10 will be formed on the outer ring, so that it is not necessary to cut the spherical inner surface 52 of the outer ring formed by plastic working. The manufacturing cost is thus low.

Figure 13A:
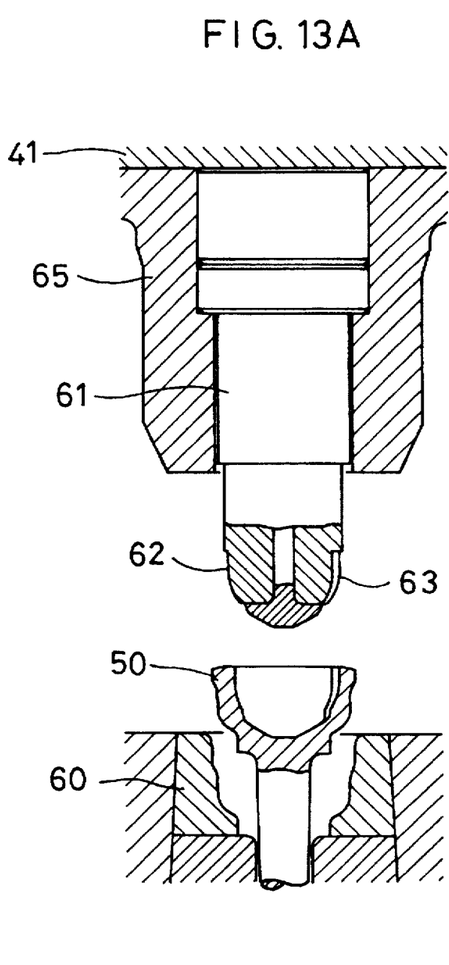
FIG. 13A is a sectional view of a preforming device for forming the blank shown in FIG. 12.
Figure 13B:
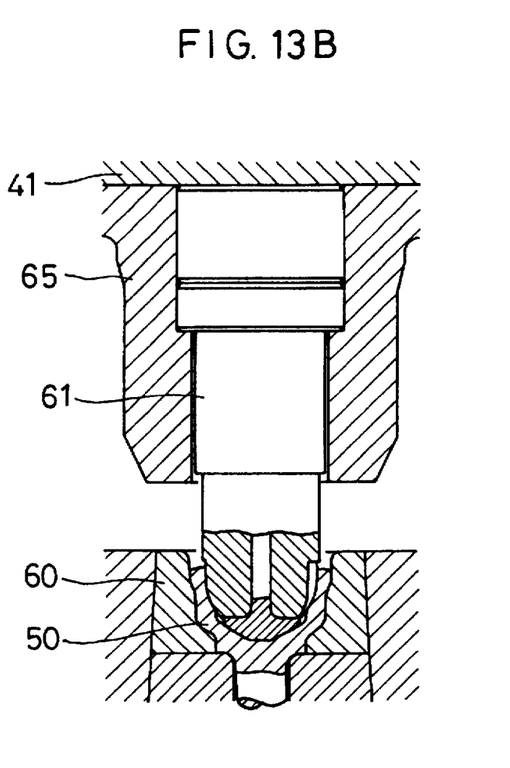
FIG. 13B is a sectional view of the device of FIG. 13A showing how the blank is formed.

The blank 50' shown in FIG. 12 is formed by a preforming device shown in FIG. 13. It comprises a drawing die 60 and a preforming punch 61. The die 60 has an inner surface complementary to the outer configuration of the outer ring blank 50 shown in FIG. 7.

The preforming punch 61 is supported by a punch holder 65 mounted on the underside of a press slide 41 and is moved toward and away from the die 60 by moving the press slide 41 up and down.

Figure 14A:
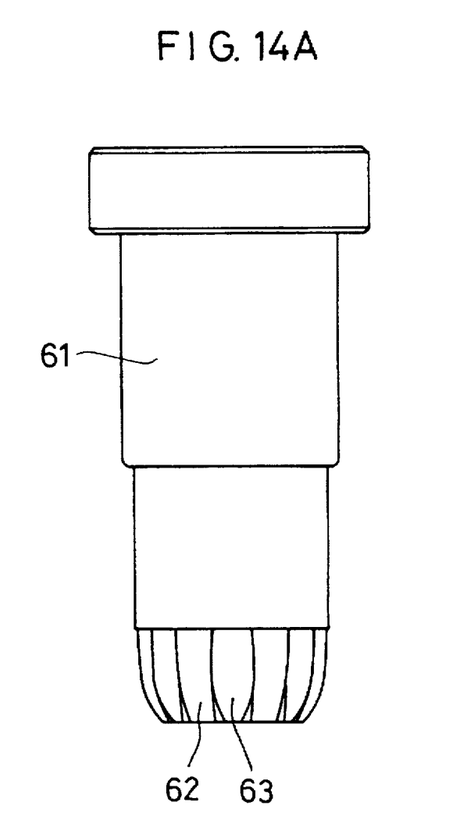
FIG. 14A is a front view of a preforming punch of the preforming device of FIG. 13A.
Figure 14B:
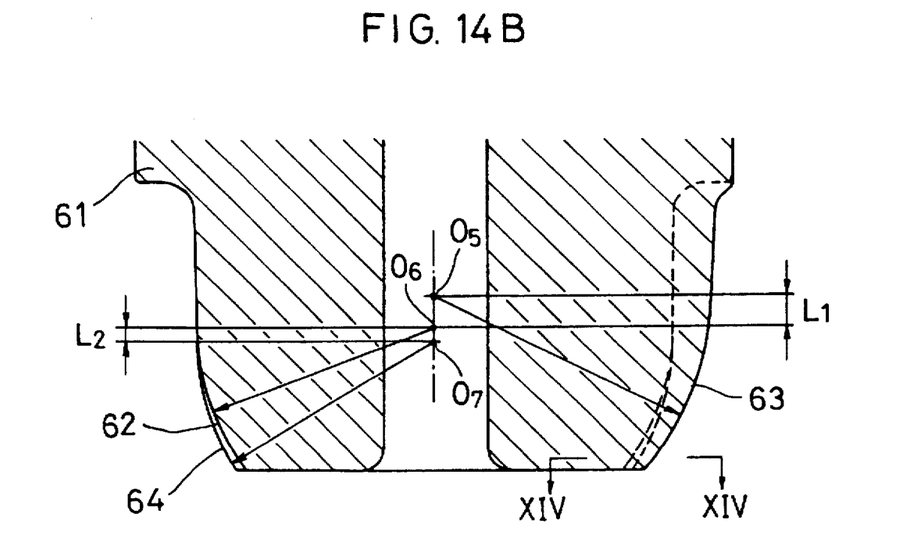
FIG. 14B is a sectional view of a tip of the punch of FIG. 14A.
Figure 14C:
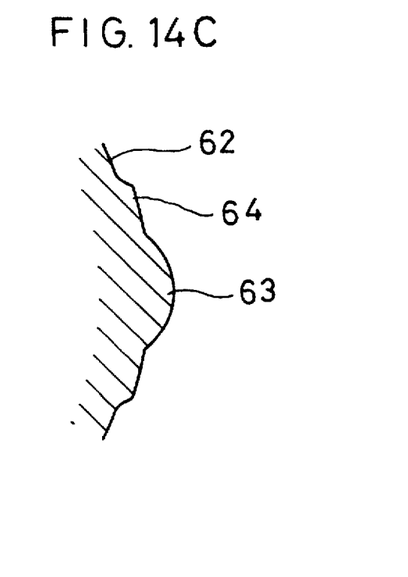
FIG. 14C is a sectional view taken along line XIV—XIV of FIG. 14B.

As shown in FIG. 14, the preforming punch 6 1 has a semispherical spherical surface forming portion 62 at its front end. A plurality of track forming portions 63 are formed on the spherical surface forming portion 62. The track forming portions 63 have a curving configuration, the center of curvature O5 thereof being offset rearwardly of the punch 61 by a distance L1 from the sphere center O6 of the spherical surface forming portion 62. This distance LI is equal to the offset distance Li between the center O3 of the track forming portion 22 shown in FIG. 5 and the center O4 of the spherical surface forming portion 21.

Along the intersection between the spherical surface forming portion 62 and the track forming portion 63, arcuate lands 64 are formed. The lands 64 have a curvature equal to that of the spherical surface forming portion 62. The center of curvature O7 thereof is offset forwardly of the preforming punch 61 by a distance L2 with respect to the sphere center O6 of the spherical surface forming portion 62. The lands 64 smoothly connects at their rear ends with the spherical surface forming portion 62.

The lands 64 narrow gradually from the front end of the preforming punch 61 to its rear end.

By lowering the press slide 41 with the outer ring blank 50 shown in FIG. 7 placed in the die 60, the preforming punch 61 supported by the punch holder 65 fixed to the bottom of the press slide 41 is pressed at its front end against the deepest part of the inner surface of the blank 50. The track grooves 51 and the deep side of the spherical inner surface 52 are formed in the deeper inner surface of the blank. At the same time, the recesses 56 asshown in FIGS. 12A–12C are formed along the intersection between the track grooves 51 and the spherical inner surface 52.

By preforming the forged outer ring blank 50 with the preforming device shown in FIG. 13 before working it by plastic deformation using the forming device shown in FIGS. 7 and 8, it is possible to omit the step of turning or grinding the deep part of the spherical inner surface 2 after plastic working. Thus, it is possible to further reduce the manufacturing cost. Also, the recesses 11 as grease traps will improve lubricity.

While torque is being transmitted with the homokinetic joint with a working angle, the cage 8 will be pushed axially under an external force. The larger the working angle, the larger this external force. The outer ring 1 having recesses 56 shown in FIG. 12 has an advantage in that the axial load applied to the cage 8 can be borne by the deeper part of the spherical inner surface 52 too, because the entire spherical inner surface 52 is formed by plastic working using the punch 20 shown in FIG. 7.

According the present invention, the spherical inner surface and the track grooves of the outer ring are formed by plastic working using punches each having a spherical surface forming portion and a track forming portion which are formed by grinding. The outer ring thus formed needs no additional finishing work, so that it can be manufactured at a lower cost.

By preforming the spherical inner surface and the surfaces of the track grooves with the preforming punch and forming recesses at the deeper part of the boundary between the spherical inner surface and the surfaces of the track grooves before subjecting the outer ring blank to plastic working, the blank will be deformed during plastic working so as to fill the recesses. This makes it unnecessary to cut the deep part of the spherical inner surface after plastic working. Thus, it is possible to cut the manufacturing cost still further.

Also, since grease is trapped in these recesses, it is possible to lubricate the outer ring effectively.

What is claimed is:

1. A homokinetic joint comprising:
   an outer ring having a spherical inner surface formed with a plurality of curving track grooves, wherein each of said track grooves has a constant effective depth from an open end of said outer ring to a point past the sphere center of said spherical inner surface of said outer ring;
   an inner ring having a spherical outer surface formed a plurality of track grooves, wherein the number of track grooves formed in said inner ring is the same as the number of track grooves formed in said outer ring;
   a plurality of torque transfer balls received in said track grooves formed in said inner and outer rings, respectively; and
   a cage guided by spherical inner surface of said outer ring and said spherical outer surface of said inner ring for retaining said torque transfer balls in position, said track grooves formed in said outer ring and said track grooves formed in said inner ring having their respective centers offset in opposite axial directions by an equal distance with respect to the angular center of said joint, characterized in that the surfaces of said tracks grooves formed in said outer ring and said spherical inner surface of said outer ring are finished by plastic forming.

2. The homokinetic joint as claimed in claim 1, wherein a recess is formed in said spherical inner surface of said outer ring at a location which is offset from the sphere center of said spherical inner surface in a direction away from said open end of said outer ring.

3. The homokinetic joint as claimed in claim 1, wherein a recess is formed in said outer ring at an end of said outer ring, which is opposed to said open end of said outer ring, said recess being located further from said open end of said outer ring than any point along an edge formed by the intersection of said spherical inner surface and the surfaces of said track grooves formed in said outer ring.

4. The homokinetic joint as claimed in claim 1, wherein each track groove, formed in said outer ring, includes a relief on each side of said track groove.

* * * * *